United States Patent [19]
Funabashi et al.

[11] Patent Number: 4,524,153
[45] Date of Patent: Jun. 18, 1985

[54] METHOD OF AND SYSTEM FOR REGENERATING POWDERY ION-EXCHANGE RESIN

[75] Inventors: Kiyomi Funabashi, Katsuta; Toshio Takagi, Hitachi; Fumio Kawamura, Hitachi; Makoto Kikuchi, Hitachi, all of Japan

[73] Assignee: Hitachi, Ltd., Tokyo, Japan

[21] Appl. No.: 316,767

[22] Filed: Oct. 30, 1981

[30] Foreign Application Priority Data

Oct. 30, 1980 [JP] Japan .................. 55-153359

[51] Int. Cl.³ .............................................. B01D 15/06
[52] U.S. Cl. ........................................ 521/26; 209/173
[58] Field of Search ............... 521/26; 494/67, 68; 209/173

[56] References Cited

U.S. PATENT DOCUMENTS 3,389,080  6/1968  Arden ................................. 521/26
3,582,504  6/1971  Salem et al. ........................ 521/26

FOREIGN PATENT DOCUMENTS 54-097579  8/1979  Japan ................................. 521/26

Primary Examiner—Joseph L. Schofer
Assistant Examiner—Peter F. Kulkosky
Attorney, Agent, or Firm—Beall Law Offices

[57] ABSTRACT

A powdery cation-exchange resin and a powdery anion-exchange resin which are coupled to each other are stripped apart by the use of an electrolytic solution whose ionic strength is 5 to 15, and both the stripped ion-exchange resins are separated by letting them stand or by employing a centrifugal separator, thereby regenerating the powdery cation-exchange and anion-exchange resins.

21 Claims, 8 Drawing Figures

METHOD OF AND SYSTEM FOR REGENERATING POWDERY ION-EXCHANGE RESIN

BACKGROUND OF THE INVENTION

This invention relates to a method of regenerating a powdery ion-exchange resin and a system for regenerating it.

As means for removing solid impurities from a liquid, there is a precoat filter. The precoat filter has a filter member which is made of a holder precoated with a powder such as cellulose, diatomaceous earth and asbestos (hereinbelow, termed "filter aid"). The filter aid layer with which the holder is precoated removes the solid impurities in the liquid.

Recently, a precoat filter which employs as its filter aid a powdery ion-exchange resin disclosed in Japanese Patent Publication No. 44903 (1972) has come into use in nuclear and thermal power stations, etc. An example in which this precoat filter was applied to a nuclear power station is described in Japanese Laying-open Patent Publication No. 101394 (1977). More specifically, a condensing and desalting filter precoated with the powdery ion-exchange resin is disposed in the piping of the water feed system of a boiling water reactor.

In case where the filter aid layer formed by the precoating has gotten clogged by passing the liquid to-be-treated through the precoat filter for a predetermined time, the backwash is performed to strip off the filter aid with which the holder has been precoated and the solid impurities which have been removed thereby, and the stripped filter aid is put to an abandonment disposal. This is not exceptional even in the precoat filter which employs the powdery ion-exchange resin as the filter aid. Each time the backwash is performed, the powdery ion-exchange resin becomes a waste. Especially in the application to the nuclear power station, the used powdery ion-exchange resin produced by the backwash must be disposed of as a radioactive waste. Since the backwash of the aforecited condensing filter precoated with the powdery ion-exchange resin is carried out at a rate of one time in about ten days, the used powdery ion-exchange resin being radioactive or the secondary waste appears in large quantities.

The technology of regenerating granular cation- and anion-exchange resins for use in a desalting equipment has been established. Examples thereof are described in Japanese Patent Publications No. 9001 (1966), No. 41110 (1978) and No. 29734 (1980). In any of these examples, a solution which has a specific gravity intermediate between the specific gravity of the granular cation-exchange resin and that of the granular anion-exchange resin is used to separate the respective ion-exchange resins, whereupon the granular cation-exchange resin is regenerated with sulfuric acid and the granular anion-exchange resin with sodium hydroxide. As the solution for the separation, Japanese Patent Publication No. 9001 (1966) employs a sucrose solution, and Japanese Patent Publications No. 41110 (1978) and No. 29734 (1980) employ sodium hydroxide. The regenerating methods described in these official gazettes are difficult of regenerating the powdery ion-exchange resin in which a powdery cation-exchange resin and a powdery anion-exchange resin are attracted to each other by their static charges to form floc.

SUMMARY OF THE INVENTION

An object of this invention is to provide a method of and a system for regenerating a powdery ion-exchange resin as can simply execute the regeneration.

A characterizing feature of this invention consists in that a powdery cation-exchange resin and a powdery anion-exchange resin are stripped off from one another, that the stripped powdery cation- and anion-exchange resins are separated, and that the powdery cation- and anion-exchange resins are regenerated. A further characterizing feature consists in enhancing the stripping-off properties of both the resins and also increasing the separation speed by the use of the centrifugal separation.

DETAILED DESCRIPTION OF THE PREFERRED EMBODIMENTS

Figure 1:
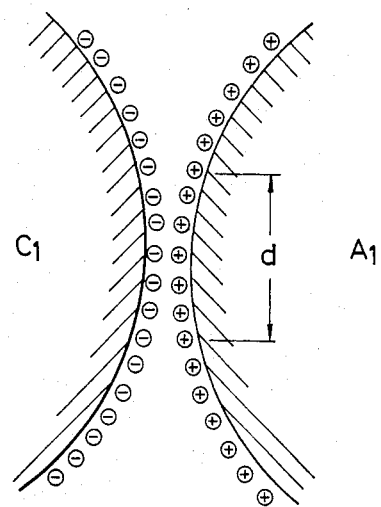
FIG. 1 shows the charged states of granular ion-exchange resins.
Figure 2:
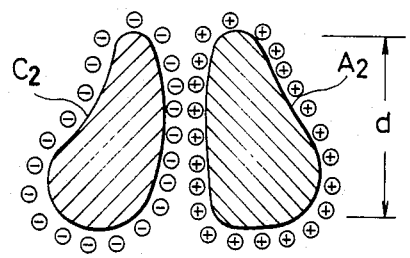
FIG. 2 shows the charged states of powdery ion-exchange resins.

A powdery ion-exchange resin whose grain size is 2–90$\mu$ exhibits a unique phenomenon which is not observed in a granular ion-exchange resin whose grain size is 0.25–1.2 mm. More specifically, when a powdery cation-exchange resin and a powdery anion-exchange resin are mixed, they form floc (or flocks) which has a bulk volume several times greater than the sum of the bulk volumes of the respective powdery resins before being mixed. This phenomenom is considered to be based on a reason as stated below. FIG. 1 typically shows the charged states of granular ion-exchange resins in the pure water, and FIG. 2 the charged states of powdery ion-exchange resins in the pure water. The granular cation-exchange resin $C_1$ and the powdery cation-exchange resin $C_2$ illustrated in FIGS. 1 and 2 are negatively charged in the pure water. On the other hand, the granular anion-exchange resin $A_1$ and the powdery anion-exchange resin $A_2$ are positively charged in the pure water. Therefore, electrostatic forces act between the granular cation-exchange resin $C_1$ and the granular anion-exchange resin $A_1$ and between the powdery cation-exchange resin $C_2$ and the powdery anion-exchange resin $A_2$. The length d of a part where the electrostatic force is acting can be regarded as being substantially constant irrespective of the grain size, so that an ion-exchange resin of smaller grain size undergoes a greater attractive force based on static charges. This is the reason why the floc is formed when the powdery cation- and anion-exchange resins are mixed, whereas no floc is formed even when the granular cation- and anion-exchange resins are mixed. Owing to the flocculation, the powdery ion-exchange resin has as filtration characteristics the excellent characteristics that the permeability of a liquid to-be-treated is high, so the differential pressure rises little. Since the powdery ion-exchange resin is charged, it electrostatically adsorbs solid impurities in the liquid to-be-treated and exhibits a high removal efficiency. Filter materials other than cellulose and asbestos do not give rise to the charging phenomenon as in the powdery ion-exchange resin. Although the charging of the powdery ion-exchange resin produces remarkably good results in the filtration characteristics, it is very inconvenient for regenerating the resin by separating the cation-exchange resin and the anion-exchange resin as in the granular ion-exchange resin.

As a method of regenerating the granular cation-exchange resin and the granular anion exchange resin, there is the method which employs a separating solution having a specific gravity intermediate between those of the respective resins as stated before. Japanese Patent Publication No. 9001 (1966) employs a sucrose solution as the separating liquid. Japanese Patent Publications No. 41110 (1978) and No. 29734 (1980) employ as the separating liquid a sodium hydroxide solution whose specific gravity lies within a range of 1.088–1.17. even with such separating liquid, the powdery cation-exchange resin and the powdery anion-exchange resin cannot be separated.

Figure 3:
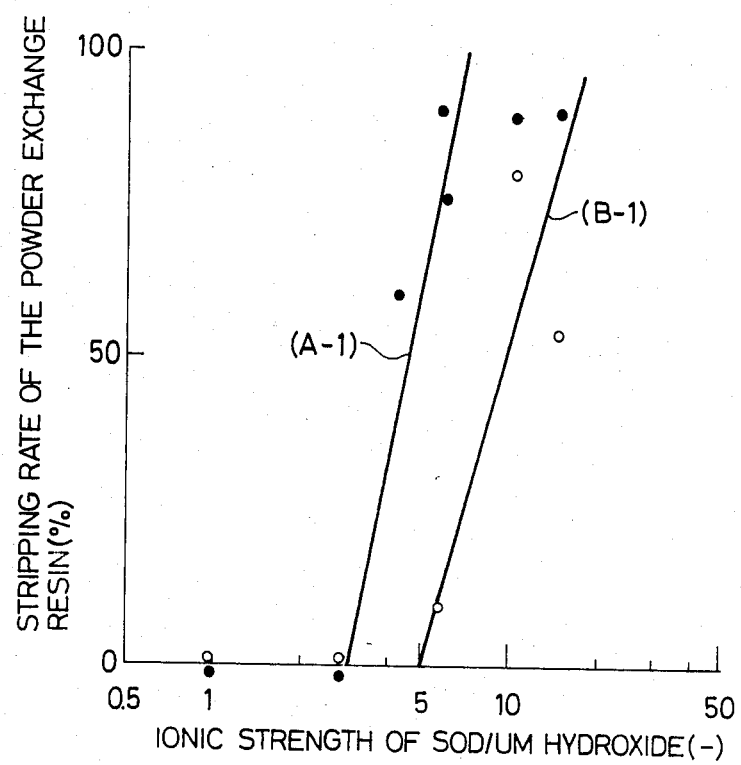
FIG. 3 shows the stripping rate of the floc between a powdery cation-exchange resin and a powdery anion-exchange resin in the case of employing a solution of sodium hydroxide as an electrolytic solution.

The powdery cation-exchange resin and the powdery anion-exchange resin need to be regenerated by simple operations. From such viewpoint, the inventors of this invention conducted various experiments and have found a suitable method. It is a method in which the powdery cation-exchange resin and the powdery anion-exchange resin are stripped off and separated. First, there will be explained the results of experiments on the stripping of a powdery cation-exchange resin and a powdery anion-exchange resin which form the floc. Shown in FIG. 3 is the stripping rate of the floc between the powdery cation-exchange resin and the powdery anion-exchange resin in the case of employing a sodium hydroxide solution as an electrolytic solution. In FIG. 3, A-1 indicates a case where the centrifugal separation was performed at 300 r.p.m. (about $10^3$ G) for 5 minutes, and B-1 indicates a case where the quiescent separation was performed in a separating tank. The axis of abscissas represents the ionic strength of sodium hydroxide. The ionic strength signifies the potential of the electrolytic solution which tends to neutralize the charges of the surface of solids (the powdery cation- and anion-exchange resins) from the point of the interfacial static-electricity phenomenon. This ionic strength I is calculated by the following equation:

$$I = \tfrac{1}{2} \Sigma c_i Z_i^2 \tag{1}$$

where i denotes the kind of the ion, C the molarity of the ion, and the Z the charge of the ion. As indicated by Equation (1), the ionic strength becomes a greater value as the ionic concentration in the electrolytic solution is higher and as the charge of the ion is greater. That is, when the ionic concentration in the electrolytic solution becomes high, it becomes easy for ions to adhere onto the surfaces of the powdery cation-and anion-exchange resins, and when the charge of the ion is great, the capability of the ions to neutralize the charges of the resin surfaces increases. As apparent from FIG. 3, the execution of the centrifugal separation is more effective. Especially with the electrolytic solution whose ionic strength is 5 or above, the powdery cation-exchange resin and the powdery anion-exchange resin can be stripped off.

Figure 4:
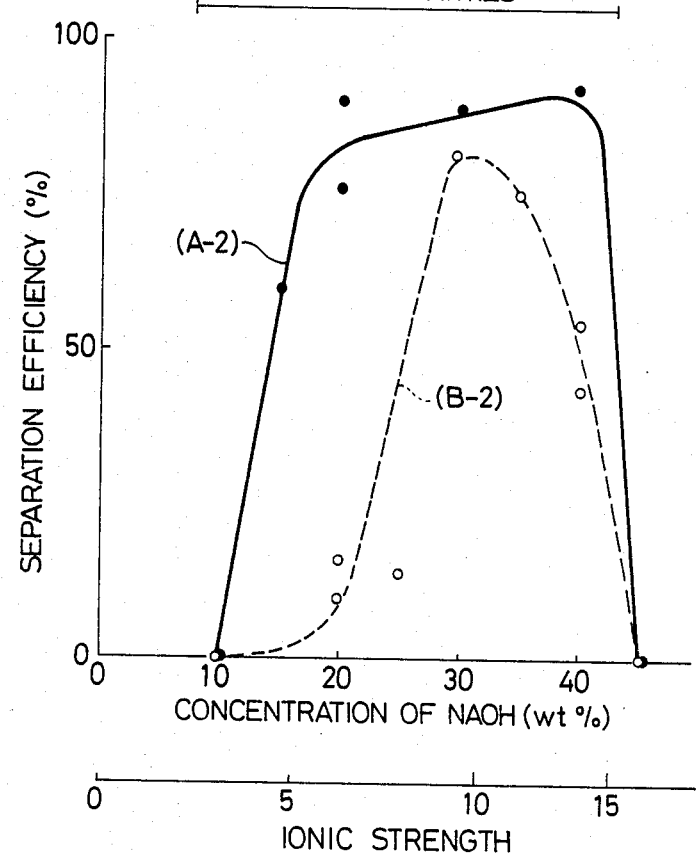
FIG. 4 shows the relationship between the ionic strength of an electrolytic solution and the separation efficiency of powdery ion-exchange resins.

Now, there will be explained the separation between the powdery cation-exchange resin and the powdery anion-exchange resin. FIG. 4 illustrates the separation efficiency under the same conditions as in FIG. 3. A-2 indicates the case of the centrifugal separation, and B-2 the case of the quiescent separation.

Figure 5:
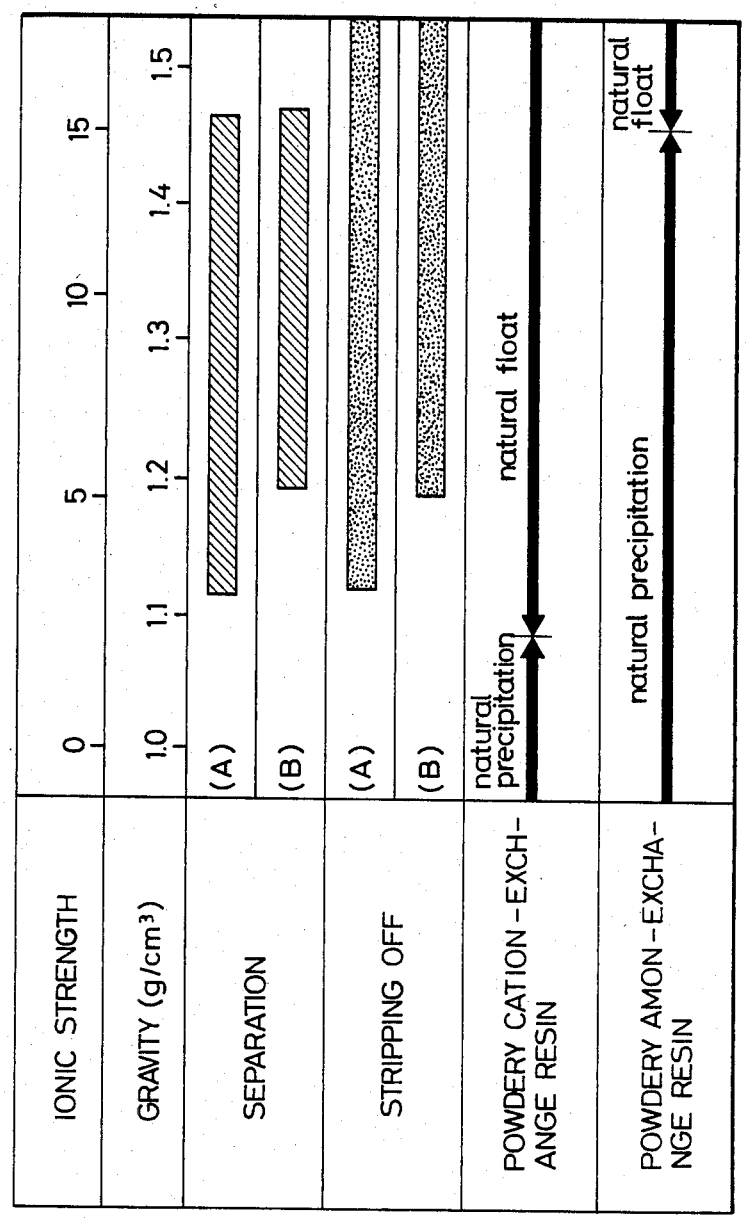
FIG. 5 shows the stripped regions and separated regions of two kinds of powdery ion-exchange resins.

It is understood from FIG. 4 that the execution of the centrifugal separation is effective. Especially, the NaOH solution whose ionic strength is at least 5 is effective. The reason why the high separation efficiency is thus attained even with the NaOH solution of low concentration by executing the centrifugal separation, is interpreted as follows. The buoyancy chiefly acts on the powdery anion-exchange resin of small specific gravity, and the gravity on the powdery cation-exchange resin of greater specific gravity. The buoyancy and the gravity are proportional to the gravitational acceleration, and they become large values when the gravitational acceleration increases. In case where the liquid to-be-treated is held quiescent, the gravitational acceleration is constant. In contrast, in the case of the centrifugal separation, the gravitational acceleration apparently increases under the action of a centrifugal force. The gravitational acceleration based on the centrifugal force amounts usually to 1000G–5000G or so, and the gravitational acceleration which is 1000–5000 times greater than in the quiescent separation is attained. On the basis of such fact, a force intending to draw apart the powdery cation-exchange resin and the powdery anion-exchange resin will be generated to enhance the stripping-off properties of both the resins. Thus, the separation efficiency will become high as seen in FIG. 4. FIG. 4 indicates that even the fine powdery cation-exchange resin and anion-exchange resin which have been stripped off by the quiescence can be separated on the basis of the difference of the specific gravities likewise to the granular ion-exchange resin. This is the result of an experiment conducted in such a way that the powdery cation-exchange resin and the powdery anion-exchange resin were respectively immersed in the NaOH solution and that the specific gravity of the NaOH solution was varied. The powdery cation-exchange resin precipitated when the specific gravity of the NaOH solution was 1.46 or below, while the powdery anion-exchange resin floated when the specific gravity of the NaOH solution was 1.08 or above. FIG. 5 shows the stripped regions and separated regions of the powdery cation-exchange resin and anion-exchange resin as were obtained from FIGS. 3 and 4. As a result, it has been revealed that when the electrolytic solution whose ionic strength lies in a range of 5—about 15 (specific gravity: 1.18–1.46) is used, the stripping and separation between the powdery cation-exchange resin and the powdery anion-exchange resin can be simultaneously executed. This remarkably simplifies the regenerating operations of the powdery cation-exchange resin and the powdery anion-exchange resin. In addition, the period of time required for the regenerating operations is remarkably shortened. In case of an application to an actual plant, it is favorable in consideration of the ion exchangiabilities in reuse that the ionic strength of the electrolytic solution is set in a range of 10—about 15.

When the case of the centrifugal separation and the case of the quiescent separation are compared, the periods of time required for the separations were 5 minutes and 24 hours respectively. In the case of the centrifugal separation, as described before, the gravity increases apparently and the precipitation rate increases as to the powdery cation-exchange resin, whereas the buoyancy increases apparently and the floating rate increases as to the powdery anion-exchange resin. In the case of the centrifugal separation, such phenomenon permits the shortening of the period of time required for the separation.

This invention has been made in accordance with these results of study. The method of regenerating a powdery ion-exchange resin which is a preferred embodiment of this invention will be described with reference to FIG. 6.

A clad which is adherent on the surface of the powdery ion-exchange resin E having been discharged by the backwash of the condensing and desalting filter of the boiling water reactor described before, is removed by clad separation F. The clad consists of solid fine grains which have a grain size of approximately 1–10$\mu$ and whose principal component is iron oxide. The clad separation F is carried out in such a way that the slurry of the powdery ion-exchange resin E is irradiated with ultrasonic waves with a dispersant mixed in the slurry. The separated clad of high radioactivity level is disposed of as a radioactive waste. The powdery ion-exchange resin with the clad removed therefrom is immersed in an electrolytic solution whose ionic strength lies in a range of 5—about 15. Then, the powdery cation-exchange resin $C_2$ and the powdery anion-exchange resin $A_2$ which are attracted to each other are stripped off and are simultaneously separated (stripping and separation of the ion-exchange resin, G). The powdery cation-exchange resin $C_2$ and the powdery anion-exchange resin $A_2$ which have been separated are respectively regenerated with $H_2SO_4$ and a NaOH in individual regenerating steps H and I, to restore thier ion exchangiabilities. The powdery cation- and anion-exchange resins $C_2$ and $A_2$ which have been regenerated are mixed, whereupon the mixture is reused as a precoating material for the condensing and desalting filter. The operations of regenerating the powdery ion-exchange resin are simplified, and apparatus required for the regeneration is also simplified. The reuse of the powdery ion-exchange resin is permitted, and the lifetime of the powdery ion-exchange resin lengthens remarkably, so that the amount of generation of the radioactive waste is remarkably reduced in the application to the nuclear power station.

Figure 6:
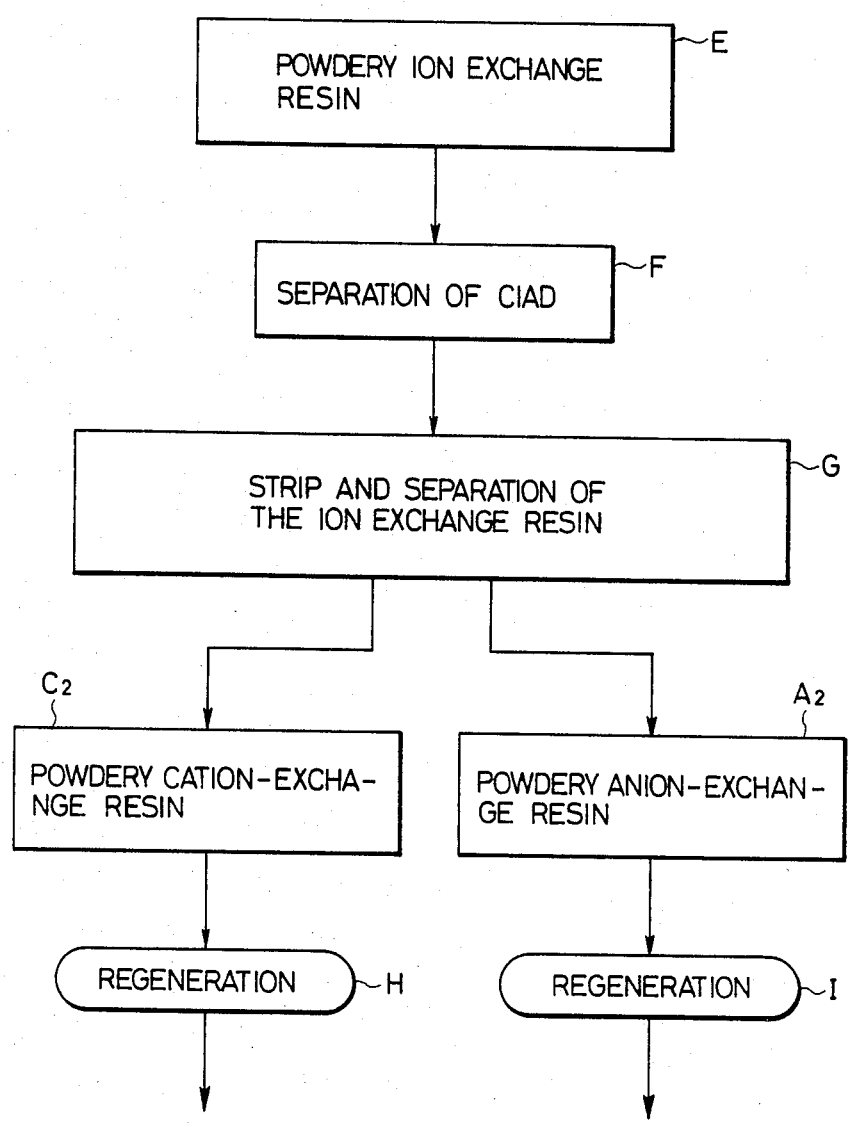
FIG. 6 is a flow sheet showing the steps of the method of regenerating a powdery ion-exchange resin according to this invention.
Figure 7:
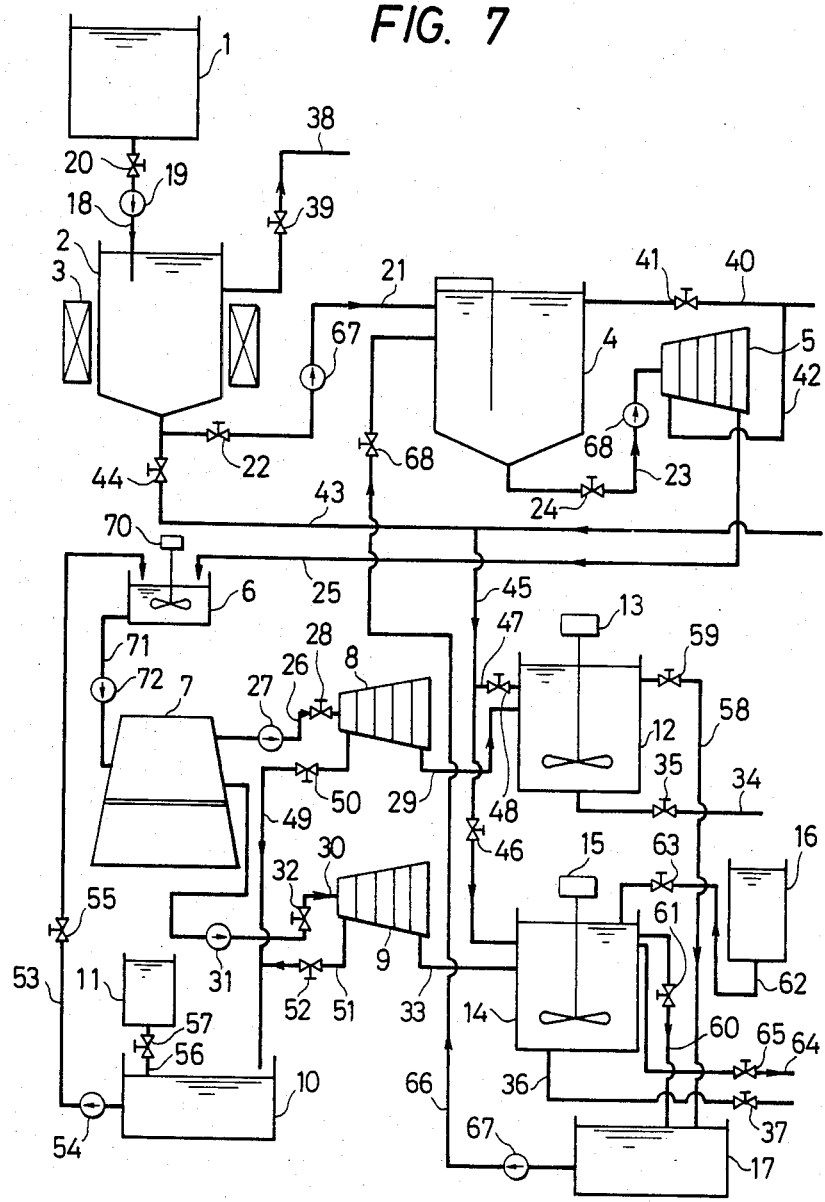
FIG. 7 is a flow chart of a system for regenerating a powdery ion-exchange resin in the case of using a centrifugal separator.

Shown in FIG. 7 is an example of the flow sheet of an apparatus for regenerating the powdery ion-exchange resin in which the method illustrated in FIG. 6 is employed. The regenerating system is constructed of a clad separating tank 2, a resin separating centrifugal separator 7, and regenerating tanks 12 and 14. A pipe 18 mounted on a resin tank 1 is held in communication with the clad separating tank 2. A pump 19 and a valve 20 are disposed in the pipe 18. An ultrasonic signal generator 3 is arranged around the clad separating tank 2. A pipe 38 having a valve 39 is connected to the clad separating tank 2. The pipe 38 is held in communication with a clad storing tank. A pipe 21 holds the clad separating tank 2 and an ion separation tank 4 in communication, while a pipe 23 holds the ion separation tank 4 and a centrifugal dehydrator 5 in communication. Valves 22 and 24 are respectively disposed in the pipes 21 and 23. An adjusting tank 6 has a stirrer 70 arranged just under the centrifugal dehydrator 5 though this is different in the illustration. A pipe 25 which actually extends rectilinearly from the centrifugal dehydrator 5 is held in communication with the adjusting tank 6. A pipe 71 having a pump 72 connects the adjusting tank 6 and the resin separating centrifugal separator 7. A pipe 26 having a pump 27 as well as a valve 28 connects the resin separating centrifugal separator 7 and a centrifugal dehydrator 8. A pipe 29 connected with the centrifugal dehydrator 8 is mounted on the regenerating tank 12 in which a stirrer 13 is inserted. The regenerating tank 12 is arranged just under the centrifugal dehydrator 8. A pipe 30 having a pump 31 as well as a valve 32 holds the resin separating centrifugal separator 7 and a centrifugal dehydrator 9 in communication. A pipe 33 connects the centrifugal dehydrator 9 and the regenerating tank 14. A container 16 filled with an $H_2SO_4$ solution is connected to the regenerating tank 14 by a pipe 62. A stirrer 15 is disposed in the regenerating tank 14. The regenerating tank 14 is arranged just under the centrifugal dehydrator 9. A valve 63 is disposed in the pipe 62. Pipes 34 and 36 connected to a mixing tank (not shown) are respectively connected to the regenerating tanks 12 and 14. Valves 35 and 37 are disposed in the respective pipes 34 and 36. Pipes 40 and 64 communicating with a regeneration waste liquid tank (not shown) are respectively held in communication with the ion separation tank 4 and the regenerating tank 14. The pipes 40 and 64 have valves 41 and 65, respectively. A pipe 42 mounted on the centrifugal dehydrator 5 is connected to the pipe 40. A pipe 58 mounted on the regenerating tank 12, and a pipe 60 mounted on the regenerating tank 14 are held in communication with a pretreatment solution tank 17. Valves 59 and 61 are respectively disposed in the pipes 58 and 60. The pretreatment solution tank 17 and the ion separation tank 4 are held in communication by a pipe 66 which has a pump 67 and a valve 68. An electrolytic solution tank 10 is held in communication with the adjusting tank 6 by a pipe 53 which has a pump 54 and a valve 55. A container 11 filled with NaOH is connected to the electrolytic solution tank 10 by a pipe 56. A valve 57 is disposed in the pipe 56. A pipe 51 connected to the centrifugal dehydrator 9 is connected with a pipe 49 which is mounted on the centrifugal dehydrator 8. The pipe 49 is held in communication with the electrolytic solution tank 10. Valves 50 and 52 are respectively mounted on the pipes 49 and 51. A pipe 43 is attached to the pipe 21. A pipe 45 to which a pipe 47 mounted on the regenerating tank 12 is connected holds the pipe 43 and the regenerating tank 14 in communication. Valves 44, 46 and 48 are respectively disposed in the pipes 43, 45 and 47.

The condensing and desalting filter disposed in the water feed piping which holds the condenser and reactor pressure vessel of the boiling water reactor in communication is washed back when a predetermined differential pressure has been reached. By this backwash, the powdery ion-exchange resin (with the powdery cation-exchange resin and the powdery anion-exchange resin mixed at 1:2) which has an average grain size of 10$\mu$ and which is included in the condensing and desalting filter by the precoating is discharged in the slurry state from the condensing and desalting filter and is led to the resin tank 1. Cations are adherent to the powdery cation-exchange resin, and anions to the powdery anion-exchange resin. Moreover, the clad is adherent on the surfaces of these powdery ion-exchange resins, especially the powdery cation-exchange resin. The pump 19 is driven to supply the powdery ion-exchange resin slurry in the resin tank 1 into the clad separating tank 2. After a predetermined amount of the resin slurry has been led into the tank 2, the pump 19 is stopped. A surface-active agent such as DBS solution, serving as a dispersant, is mixed in the clad separating tank 2. As the dispersants, there are chelating agents, acids, acids and alkalies besides the surface-active agents. The dispersant functions to keep the clad, which has been stripped off the powdery ion-exchange resin, dispersed in the slurry without adhering to the powdery ion-exchange resin again. The surface-active agent and the chelating agent change the surface properties of the stripped clad, to prevent the clad from adhering to the powdery ion-exchange resin, while the acid and the alkali neutralize the surface charges of the powdery ion-exchange resin, to prevent the clad from adhering to the powdery ion-exchange resin. Under the state under which the dispersant is mixed in the powdery ion-exchange resin slurry, the ultrasonic signal generator 3 is operated to irradiate the slurry with ultrasonic waves for a predetermined time. The clad adhered to the powdery ion-exchange resin is stripped off, and floats to the upper part of the clad separating tank 2 while the ultrasonic signal generator 3 is operating. The powdery ion-exchange resin precipitates to the bottom part of the clad separating tank 2. The valve 39 is opened to lead the clad in the upper part of the clad separating tank 2 into the clad storing tank (not shown) through the pipe 38. After the discharge of the clad has ended, the valve 22 is opened and the pump 67 is driven to supply the ion separation tank 4 with the slurry of the powdery ion-exchange resin which lies in the clad separating tank 2 and from which the clad has been removed. After the valve 22 has been closed, the powdery ion-exchange resin slurry is introduced from the resin tank 1 into the clad separating tank 2. The thin NaOH aqueous solution in the pretreatment tank 17 is led into the ion separation tank 4 by driving the pump 67. The NaOH aqueous solution in the ion separating tank 4 is at a concentration of 2%. The ionic strength of this NaOH aqueous solution is smaller than 5. The powdery ion-exchange resin precipitates to the bottom part of the ion separating tank 4. Part of the NaOH aqueous solution in the upper part of the ion separating tank 4 is led into the regeneration waste liquid tank (not shown) through the pipe 40 by opening the valve 41. In the ion separating tank 4, some of the anions adherent to the powdery anion-exchange resin $A_2$ are removed, and part of the resin $A_2$ is regenerated. In addition, $Na^+$ adheres to the surface of the powdery cation-exchange resin $C_2$. By driving the pump 69, the powdery ion-exchange resin slurry is supplied into the centrifugal dehydrator 5, and 80% of water in the powdery ion-exchange resin slurry as contains NaOH is removed. This water is introduced into the aforecited regeneration waste liquid tank through the pipes 42 and 40. The powdery ion-exchange resin slurry including the remaining 20% of water is gravitationally introduced from the centrifugal dehydrator 5 through the pipe 25 into the adjusting tank 6.

The NaOH aqueous solution which lies in the electrolytic solution tank 10 and which contains 20 weight-% of NaOH (ionic strength: 6, specific gravity: 1.21) is supplied into the adjusting tank 6 through the pipe 53. The powdery ion-exchange resin slurry and the 20% NaOH aqueous solution are uniformly mixed by the stirrer 70. The powdery ion-exchange resin is first treated in the ion separating tank 4 with the thin 2% NaOH aqueous solution, and subsequently in the adjusting tank 6 with the thick 20% NaOH aqueous solution. Therefore, the production of heat and the breakdown of the powdery ion-exchange resin are preventable. When the powdery ion-exchange resin is directly immersed in the 20% NaOH aqueous solution, the production of heat due to an abrupt reaction arises to break down the ion-exchange resin. Since the powdery ion-exchange resin slurry is supplied to the resin separating tank 6 through the centrifugal dehydrator 5, the 20% NaOH aqueous solution supplied to the adjusting tank 6 is diluted in a small proportion, and the quantity of NaOH to be supplied to the adjusting tank 6 from the container 11 described below can be made small.

The pump 72 is driven to supply the resin separating centrifugal separator 7 with the powdery ion-exchange resin slurry in the adjusting tank 6. In the separator 7, the powdery cation-exchange resin $C_2$ and the powdery anion-exchange resin $A_2$ which have formed the floc are stripped off and separated. During the operation of the resin separating centrifugal separator 7, the pumps 27 and 31 are driven. By the pump 27, the powdery anion-exchange resin $A_2$ is supplied to the centrifugal dehydrator 8 in the slurry state. 80% of 20% NaOH aqueous solution is removed by the centrifugal dehydrator 8. The removed NaOH aqueous solution is returned into the electrolytic solution tank 10 through the pipe 49. The powdery anion-exchange resin slurry which includes the remaining 20% NaOH aqueous solution is gravitationally led into the regenerating tank 12 through the pipe 29 which extends downward rectilinearly though the illustration thereof in FIG. 7 is different. The powdery cation-exchange resin $C_2$ separated by the resin separating centrifugal separator 7 is supplied to the centrifugal dehydrator 9 in the slurry state. The centrifugal dehydrator 9 removes 80% of the 20% NaOH aqueous solution. This NaOH aqueous solution flows into the electrolytic solution tank 10 through the pipe 51. The powdery cation-exchange resin slurry which includes the remaining 20% NaOH aqueous solution is gravitationally introduced into the regenerating tank 14 within the pipe 33 which extends downward rectilinearly from the centrifugal dehydrator 9. Since 80% of the NaOH aqueous solution has been recovered by the dehydrators 8 and 9, the amount of the electrolytic aqueous solution to be taken out is small, and an increase in the quantity of generation of the radioactive waste liquid and an increase in the quantity of replenishment of the electrolytic aqueous solution are preventable. The NaOH concentration in the adjusting tank 6 is measured, the degree of opening of the valve 57 is adjusted so that the concentration may become 20 weight-%, and NaOH in the container 11 is supplied into the electrolytic solution tank 10. The amount of the NaOH aqueous solution which flows out toward the regenerating tanks 12 and 14 is equal to the sum between the amount of the NaOH aqueous solution which is supplied from the centrifugal dehydrator 5 to the adjusting tank 6 and the amount of NaOH which is supplied from the container 11.

By opening the valve 48, wash water which flows through the pipes 43, 45 and 47 in succession is supplied into the regenerating tank 12 in which the powdery anion-exchange resin slurry exists, and the powdery anion-exchange resin $A_2$ is washed. At this time, the valve 59 is opened, and the stirrer 13 is also driven. The NaOH aqueous solution in the regenerating tank 12 as diluted by the washing operation flows into the pretreatment solution tank 17 through the pipe 58. After the washing of the powdery anion-exchange resin $A_2$ has ended, the valves 48 and 59 are closed. The powdery anion-exchange resin $A_2$ has had the anions adherent thereto already removed by NaOH while being sent from the resin separating tank 6 to the regenerating tank 12, so that the regeneration of the resin $A_2$ has ended. By opening the valve 35, the regenerated powdery anion-exchange resin $A_2$ is caused to flow through the pipe 34 in the slurry state and is sent to the mixing tank (not shown).

When the valves 46 and 61 are opened, wash water is supplied through the pipe 45 into the regenerating tank 14 in which the powdery cation-exchange resin $C_2$ exists. The powdery cation-exchange resin $C_2$ is washed by driving the stirrer 15. The diluted NaOH aqueous solution in the regenerating tank 14 is introduced into the pretreatment tank 17 through the pipe 60. After the washing of the powdery cation-exchange resin $C_2$ has ended, the valves 46 and 61 are closed, and the valve 63 is opened. The 10% $H_2SO_4$ aqueous solution in the container 16 is supplied into the regenerating tank 14 in a predetermined amount. The cations adherent to the powdery cation-exchange resin $C_2$ are removed by the action of $H_2SO_4$, and the powdery cation-exchange resin is regenerated. After the regeneration has ended, the valves 46 and 65 are opened, and the powdery cation-exchange resin is washed again. The $H_2SO_4$ aqueous solution in the regenerating tank 14 is sent into the foregoing regeneration waste liquid tank through the pipe 64. The radioactive waste liquid which develops by mixing the NaOH aqueous solution and the $H_2SO_4$ aqueous solution in the regeneration waste liquid tank and whose principal component is $NaSO_4$ is treated by a radioactive waste solution processor. After the end of the washing, the valves 46 and 65 are closed, and the valve 37 is opened. The powdery cation-exchange resin $C_2$ in the regenerating tank 14 is sent into the foregoing mixing tank through the pipe 36 in the slurry state, and is mixed with the powdery anion-exchange resin $A_2$. The powdery ion-exchange resin in the mixing tank is reused as the precoating material of the condensing and desalting filter, etc.

While the washing and regeneration of the powdery ion-exchange resin are being conducted in the regenerating tanks 12 and 14, no powdery ion-exchange resin is supplied from the centrifugal dehydrators 8 and 9 to the regenerating tanks. In case where the washing and regeneration of the respective resins are continuously conducted, the regenerating tanks of the respective resins are disposed in large numbers, and they are changed-over. In case where the chelating agent and the surface-active agent are used as the dispersant in the clad separating tank 2, these substances adhere to the powdery ion-exchange resin, but the former can be removed from the latter by the regeneration employing NaOH and $H_2SO_4$.

The thin NaOH aqueous solution in the pretreatment tank 17 is sent into the ion separation tank 4 through the pipe 66, and it is used as the pretreatment solution of the powdery ion-exchange resin to be led to the adjusting tank 6.

According to the present embodiment as thus far described, the stripping and separation between the powdery cation-exchange resin $C_2$ and the powdery anion-exchange resin $A_2$ can be executed in the resin separating tank at the same time, so that the construction of the regenerating system is simplified. The regeneration of the powdery ion-exchange resin can be satisfactorily executed, and the lifetime of the powdery ion-exchange resin can be remarkably prolonged. Therefore, the amount of generation of the used powdery ion-exchange resin which is the radioactive waste decreases sharply. Since the clad of high radioactivity level is removed, the surface dose rate can be made low, so that large quantities of the used powdery ion-exchange resin can be packed in a drum can, resulting in a reduced number of occurrence of drum cans. In addition, the amount of the regeneration waste liquid which is the secondary radioactive waste produced by the regeneration of the powdery ion-exchange resin is small. When the amount of solidified bodies developed by a conventional measure in which the used powdery ion-exchange resin is solidified in drum cans is supposed 1 (unity), the present embodiment sharply reduces the amount of solidified bodies to 0.32 even in terms of the sum between the numbers of the solidified bodies of the used powdery ion-exchange resin and those of the regeneration waste liquid.

The separation between the powdery cation-exchange resin $C_2$ and the powdery anion-exchange resin $A_2$ becomes possible with the electrolytic solution of low concentration. As a result, the maintenance of the apparatus is facilitated, and the deterioration of the resin lessens. Moreover, since the separation is executed in a short time, a satisfactory treating capability can be held even with a reduced apparatus scale.

Figure 8:
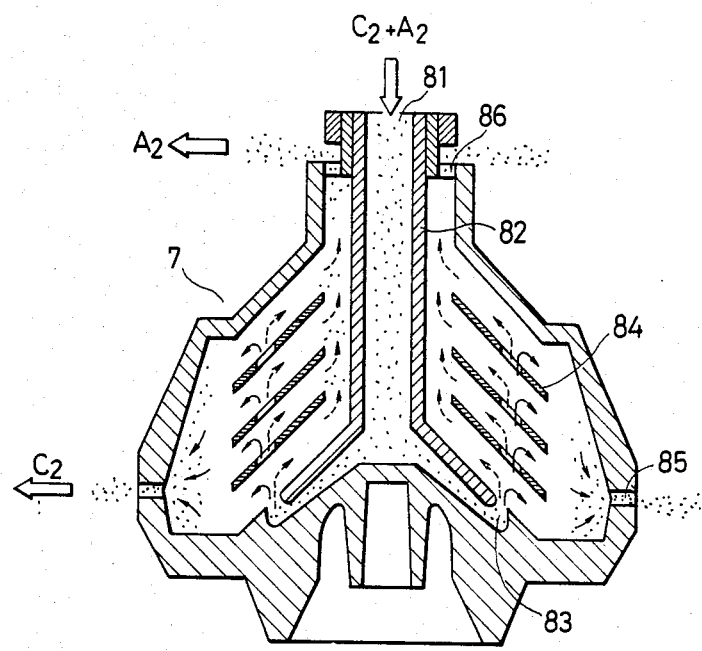
FIG. 8 shows an example of a centrifugal separator which is suitable in the performance of this invention.

FIG. 8 shows an example of the centrifugal separator which is suitable for performing this invention. This figure shows a section of the rotor portion of the centrifugal separator 7 called the "separation plate type". Here, a rotor 82 around which a nozzle is provided is exemplified. The powdery ion-exchange resin mixed with the electrolytic solution of predetermined concentration is introduced through a feed port 81 provided in the top part of the rotor 82. It passes through the central part of the rotor 82, and is emitted through a liquid supply port 83. Here, the powdery cation-exchange resin $C_2$ moves toward the outer periphery of the rotor 82 along separation plates 84 constituting the rotor 82 and is discharged out of the rotor 82 through nozzles 85. On the other hand, the powdery anion-exchange resin $A_2$ moves inwardly of the rotor 82 and ascends owing to the separation plates 84 and is discharged through a discharge port 86 provided at an upper part of the rotor 82. In this manner, the powdery cation-exchange resin $C_2$ and the powdery anion-exchange resin $A_2$ which have formed floc can be stripped off from each other. At the same time, a large number of grains of the stripped powdery cation-exchange resin $C_2$ and a large number of grains of the stripped powdery anion-exchange resin $A_2$ can be separated.

The present embodiment has employed NaOH as the electrolytic solution. However, as long as the two requisites are met that the ionic strength lies in the range of 5—about 15 and that the specific gravity is intermediate between the specific gravities of the powdery cation-exchange resin and the powdery anion-exchange resin, similar effects to those of the present embodiment can be attained even with other alkalies, inorganic acids, organic acids, inorganic salts and organic salts. Table 1 lists influences on the operations of regenerating the powdery ion-exchange resin in the case of employing various electrolytic solutions.

TABLE 1

Influences on regenerating operations dependent upon various electrolytes

| Chemicals | Regenerating operation | | Ratio of amount of production of regeneration waste liquid |
|---|---|---|---|
| | Cation resin | Anion resin | |
| Alkali | Necessary | Unnecessary | 1 |
| Inorganic acid | Unnecessary | Necessary | 1 |
| Organic acid | Necessary | Necessary | 2 |
| Inorganic salt | " | " | 2 |
| Organic salt | " | " | 2 |

In case where an inorganic acid, for example, $H_2SO_4$ is used as the electrolytic solution, the amount of production of the regeneration waste liquid does not change as in the case of employing NaOH. A system in the case of employing $H_2SO_4$ becomes as stated below. Only different portions will be explained with reference to FIG. 7. The container 11 is filled with $H_2SO_4$ of high concentration, and the container 16 with NaOH. The pipes 62 and 64 communicating with the regenerating tank 14 are connected to the regenerating tank 12. In the present embodiment, the powdery cation-exchange resin $C_2$ is regenerated between the centrifugal separator 7 and the regenerating tank 14. The powdery anion-exchange resin $A_2$ is regenerated in the regenerating tank 12. The pretreatment liquid tank 17 is supplied with only the $H_2SO_4$ aqueous solution.

In case where an organic acid, inorganic salt or organic salt is used as the electrolytic solution, both the powdery cation-exchange resin $C_2$ and the powdery anion-exchange resin $A_2$ must be regenerated with $H_2SO_4$ and NaOH in the regenerating tanks, and the amount of the regeneration waste liquid increases. A regenerating system in the case of using $CaCl_2$ as the electrolytic solution will be explained as to only different portions with reference to FIG. 7. The container 11 is filled with a $CaCl_2$ aqueous solution of high concentration. A container filled with NaOH and a pipe connected to the regeneration waste liquid tank are held in communication with the regenerating tank 12. The pipe 40 is unnecessary. The two kinds of powdery ion-exchange resins are respectively regenerated in the regenerating tanks 12 and 14. The pretreatment tank 17 is supplied with only the $CaCl_2$ aqueous solution which develops during the washing of the powdery ion-exchange resin. The $CaCl_2$ aqueous solution discharged into the pipe 42 is also disposed of as the radioactive waste.

While, in the present embodiment, the separation plate type centrifugal separator having the nozzles has been employed as the resin separating centrifugal separator, similar effects are achieved even with different centrifugal separators, for example, one which includes no nozzle and which can intermittently emit the powdery cation-exchange resin without stopping the rotation, one which is not provided with the separation plates, and one which includes a superdecanter having a continuous emission function. Further, the centrifugal separator may well be replaced with a quiescent separation tank in which the stripping and the separation are effected by the natural precipitation.

This invention is applicable, not only to the nuclear power station, but also to a thermal power station, general water disposal, etc.

According to this invention, the stripping and separation of two sorts of powdery ion-exchange resins can be simultaneously executed, and the regeneration of a powdery ion-exchange resin can be simply performed.

What we claim is:

1. A method of regenerating powdery ion-exchange resin particles, said particles having a size in the range of 2–90μ, comprising:

providing powdery ion-exchange resin comprising powdery cation-exchange resin and powdery anion-exchange resin coupled to each other;

immersing said coupled resin in an electrolytic solution, the ionic strength of said electrolytic solution being in a range of 5 to 15 and the specific gravity of the electrolytic solution being in a range between the specific gravity of the cation-exchange resin and the specific gravity of the anion-exchange resin;

stripping apart and simultaneously separating said cation and anion-exchange resins in said solution; and separately removing ions adherent to the cation-exchange resin and to the anion-exchange resin.

2. A method of regenerating powdery ion-exchange resin as defined in claim 1, wherein said electrolytic solution is a solution of alkali or inorganic acid.

3. A method of regenerating powdery ion-exchange resin particles, said particles having a size in the range of 2–90μ, comprising the first step of immersing in an electrolytic solution of low concentration a powdery cation-exchange resin and a powdery anion-exchange resin which are coupled with each other, the second step of immersing said powdery cation-exchange resin and said anion-exchange resin in a coupled state in an electrolytic solution after said first step, this electrolytic solution having a concentration higher than that of the first-mentioned electrolytic solution, having an ionic strength in a range of 5 to 15, and having a specific gravity in a range between the specific gravity of the cation-exchange resin and the specific gravity of the anion-exchange resin, thereby to strip apart and simultaneously separate said powdery cation-exchange resin and said powdery anion-exchange resin in the second-mentioned electrolytic solution, and the third step of removing ions adherent to said powdery cation-exchange resin and said powdery anion-exchange resin.

4. A method of regenerating powdery ion-exchange resin as defined in claim 3, wherein said electrolytic solution is a solution of alkali or inorganic acid.

5. A system for regenerating powdery ion-exchange resin particles, said particles having a size in the range of 2–90μ, comprising centrifugal separator means in which a powdery cation-exchange resin and a powdery anion-exchange resin coupled to each other are simultaneously stripped apart and separated; means for supplying said powdery cation-exchange resin and said powdery anion-exchange resin to said centrifugal separator means; means for supplying an electrolytic solution to said centrifugal separator means; means to adjust the ionic strength of said electrolytic solution to a range of 5 to 15 within said centrifugal separator means; means to adjust the specific gravity of the electrolytic solution to a range between the specific gravity of the cation-exchange resin and the specific gravity of the anion-exchange resin; a first regenerating tank means in which ions adherent to said powdery anion-exchange resin are removed; a second regenerating tank means in which ions adherent to the cation-exchange resin are removed; means for deriving regenerated powdery cation-exchange resin from said first regenerating tank; and means for deriving regenerated powdery anion-exchange resin from said second regenerating tank means.

6. A system for regenerating powdery ion-exchange resin particles, the size of said particles being in the range of 2–90μ, comprising ion separation tank means in which ions adherent to coupled powdery cation-exchange resin and powdery anion-exchange resin are separated and removed; means for supplying said ion separation tank means with said coupled powdery cation-exchange resin and said powdery anion-exchange resin; means for supplying said ion separation tank means with an electrolytic solution; a centrifugal separator means in which said coupled powdery cation-exchange resin and anion-exchange resin from said pretreatment means are simultaneously stripped apart and separated; means for introducing into said centrifugal separator means an electrolytic solution of a concentration higher than that of the first-mentioned electrolytic solution so that an ionic strength of the second-mentioned electrolytic solution may lie in a range of 5 to 15 and so that the specific gravity of the electrolytic solution may lie within a range between the specific gravity of the cation-exchange resin and the anion-exchange resin within said centrifugal separator means; a first regenerating tank means in which ions adherent to said powdery cation-exchange resin are removed; a second regenerating tank means which removes ions adherent to said powdery anion-exchange resin; means for deriving the regenerated powdery cation-exchange resin from said first regenerating tank means; and means for deriving the regenerated powdery anion-exchange resin from said second regeneration tank means.

7. A system for regenerating powdery ion-exchange resin particles, each of said particles having a size within the range of 2–90μ, comprising an ion separator tank means in which ions adherent to coupled powdery cation-exchange resin and powdery anion-exchange resin are separated and removed; means for supplying said ion separation tank means with said coupled powdery cation-exchange resin and said powdery anion-exchange resin; means for supplying said ion separation tank means with an electrolytic solution; first solution separation means for separating said electrolytic solution from a slurry which contains the coupled powdery ion-exchange resins flowing out from said a centrifugal separator means to which an electrolytic solution having a concentration higher than that of the first-mentioned electrolytic solution, an ionic strength in a range of 5 to 15 and a specific gravity in a range between the specific gravity of the cation-exchange resin and the anion-exchange resin is supplied and in which said coupled powdery cation-exchange resin and said powdery anion-exchange resin from said first solution separation means are simultaneously stripped apart and separated; second solution separation means for separating said second mentioned electrolytic solution from a second slurry which contains the separated powdery cation-exchange resin flowing out from said centrifugal separator means; third solution separation means for separating said second mentioned electrolytic solution from a third slurry which contains the separated anion-exchange resin flowing out from said centrifugal separator means; means for leading to said centrifugal separator means said second mentioned electrolytic solution separated by said second and third solution separation means, a first regenerating tank means in which ions adherent to said powdery cation-exchange resin are removed; a second regenerating tank means in which ions adherent to said powdery anion-exchange resin are removed; means for deriving the regenerated powdery cation-exchange resin from said first tank means; and means for deriving the regenerated powdery anion-exchange resin from said second tank means.

8. A system for regenerating powdery ion-exchange resin particles, each of said particles having a size within the range of 2–90μ, comprising an ion separation tank means in which ions adherent to coupled powdery cation-exchange resin and powdery anion-exchange resin are separated and removed; means for supplying said ion separation tank means with said coupled powdery cation-exchange resin and said powdery anion-exchange resin; a centrifugal separator means in which said coupled powdery cation-exchange resin and said powdery anion-exchange resin from said ion separation tank means are simultaneously stripped apart and separated; means for supplying an electrolytic solution to said centrifugal separator means so that the ionic strength of said electrolytic solution may lie in a range of 5 to 10 and that the specific gravity of the electrolytic solution may lie in a range between the specific gravity of the cation-exchange resin and the specific gravity of the anion-exchange resin within said centrifugal separator means; a first washing means into which a slurry containing the separated powdery cation-exchange resin flowing out from said centrifugal separator means which washes this cation resin with a wash liquid; a second washing means into which a second slurry containing the separated powdery anion-exchange resin flowing out from said centrifugal separator means which washes this anion resin with a wash liquid; means for leading to said ion separation tank means said wash liquid which flows out froms aid first and second washing means a first regenerating tank means in which ions adherent to said powdery cation exchange resins are removed; a second regenerating tank means in which ions adherent to said powdery anion-exchange resin are removed; means for deriving the regenerated powdery cation-exchange resin from said first regenerating tank means; and means for deriving the regenerated powdery anion-exchange resin from said second regeneration means.

9. A system for regenerating powdery ion-exchange resin particles, each of said particles having a size within the range of 2–90μ, comprising clad separating tank means for removing solid clad particles adherent to coupled powdery cation-exchange resin and powdery anion-exchange resin; centrifugal separator means in which said coupled powdery cation-exchange resin and said powdery anion-exchange resin from which said solid particles have been removed are simultaneously stripped apart and separated; means for supplying an electrolytic solution to said centrifugal separator means so that the ionic strength of said electrolytic solution may line in a range of 5 to 15 and that the specific gravity of the electrolytic solution may lie in a range between the specific gravity of the cation-exchange resin and the anion-exchange resin within said powdery ion-exchange resin separating means; a first regenerating tank means in which ions adherent to said powdery cation-exchange resin are removed; a second regenerating tank means in which ions adherent to said powdery anion-exchange resin; means for deriving the regenerated powdery cation-exchange resin from said first regenerating tank means; and means for deriving the regenerated powdery anion-exchange resin from said second regenerating tank means.

10. A system for regenerating powdery ion-exchange resin particles, said particles each having a size within the range of 2–90µ, comprising a container which has an ultrasonic signal generator and into which a powdery cation-exchange resin and a powdery anion-exchange resin coupled to each other and with solid clad particles adhering thereto are introduced; means for supplying a dispersant into said container; a centrifugal separator in which said powdery cation-exchange resin and said powdery anion-exchange resin from said container as have had said solid particles removed therefrom and as are in a coupled state are simultaneously stripped apart and separated; means for supplying an electrolytic solution to said centrifugal separator so that the ionic strength of said electrolytic solution may lie in a range of 5 to 15 and that the specific gravity of the electrolytic solution may lie in a range between the specific gravity of the cation-exchange resin and the specific gravity of the anion-exchange resin within said centrifugal separator; a first regenerating tank in which ions adherent to said powdery cation-exchange resin are removed; a second regenerating tank in which ions adherent to said powdery anion-exchange resin are removed; means for deriving the regenerated powdery cation-exchange resin from said first regenerating tank; and means for deriving the regenerated powdery anion-exchange resin from said second regenerating tank.

11. A method of regenerating powdery ion-exchange resin particles, said particles having a size in the range of 2–90µ, comprising immersing large numbers of particles of a powdery cation-exchange resin and a powdery anion-exchange resin coupled to each other, into an electrolytic solution having an ionic strength in a range of 5 to 15 and having a specific gravity intermediate between those of both said resins to form a slurry; subjecting said slurry to centrifugal separation to strip apart and simultaneously separate said powdery cation-exchange resin and said powdery anion exchange resin coupled in said electrolytic solution; and removing ions adherent to said powdery cation-exchange resin and said powdery anion-exchange resin.

12. A method according to claim 1, wherein the specific gravity of the electrolytic solution is in the range of 1.18 to 1.46.

13. A method according to claim 1, wherein the ionic strength is in a range of 10 to 15.

14. A method according to claim 3, wherein the specific gravity of the electrolytic solution is in the range of 1.18 to 1.46.

15. A method according to claim 3, wherein the ionic strength is in a range of 10 to 15.

16. A method according to claim 11, wherein the specific gravity of the electrolytic solution is in the range of 1.18 to 1.46.

17. A method according to claim 11 wherein the ionic strength is in a range of 10 to 15.

18. A method of regenerating powdery ion-exchange resin particles, said particles having a size in the range of 2 to 90µ, and to which said particles solid grains are adherent, comprising:

providing powdery ion-exchange resin comprising powdery cation-exchange resin and powdery anion-exchange resin coupled to each other and to which said solid grains are adherent;

stripping off said solid grains from said powdery cation-exchange resin particles and said powdery anion-exchange resin particles which are coupled to each other;

immersing said coupled resin particles having said adherent grains removed in an electrolytic solution, the ionic strength of said electrolytic solution being in a range of 5 to 15 and the specific gravity of the electrolytic solution being in a range between the specific gravity of the cation-exchange resin and the specific gravity of the anion-exchange resin;

stripping apart and simultaneously separating said cation- and anion-exchange resins in said solution; and separately removing ions adherent to the cation-exchange resin and to the anion-exchange resin.

19. A method according to claim 18, wherein the specific gravity of the electrolytic solution is in the range of 1.18 to 1.46.

20. A method according to claim 18, wherein the ionic strength is in a range of 10 to 15.

21. A method according to claim 18 wherein the solid grains are stripped from the powdery cation-exchange resin and the powdery anion-exchange resin by irradiating with ultrasonic waves.

* * * * *